United States Patent
Spatharis (10) Patent No.: US 7,982,795 B2
(45) Date of Patent: Jul. 19, 2011

(54) IMAGE ACQUISITION AND EXPLOITATION CAMERA SYSTEM AND METHODS THEREFORE

(75) Inventor: Panayotis B. Spatharis, Washington, DC (US)

(73) Assignee: Panayotis B. Spatharis, Washington, DC (US)

( * ) Notice: Subject to any disclaimer, the term of this patent is extended or adjusted under 35 U.S.C. 154(b) by 776 days.

(21) Appl. No.: 11/398,721

(22) Filed: Apr. 6, 2006

(65) Prior Publication Data

US 2006/0227995 A1 Oct. 12, 2006

Related U.S. Application Data

(60) Provisional application No. 60/669,913, filed on Apr. 11, 2005.

(51) Int. Cl.
H04N 5/225 (2006.01)
H04N 5/222 (2006.01)
H04N 5/262 (2006.01)
G06K 9/46 (2006.01)
G03B 17/02 (2006.01)

(52) U.S. Cl. ... 348/376; 348/373; 348/375; 348/333.02; 348/239; 382/190; 396/541

(58) Field of Classification Search ............ 348/207.99, 348/231.3, 231.4, 231.5, 373, 374, 375, 307, 348/239, 333.02; 382/307, 190; 707/100, 707/104.1, E17.001, E17.004, 999.107; 396/541, 396/542

See application file for complete search history.

(56) References Cited

U.S. PATENT DOCUMENTS

| | | | |
|---|---|---|---|
| 5,221,964 A * | 6/1993 | Chamberlain et al. | 348/373 |
| 6,532,039 B2 * | 3/2003 | Anderson | 348/231.3 |
| 6,567,611 B1 | 5/2003 | Soga | |
| 6,714,724 B1 * | 3/2004 | Cook | 386/117 |
| 6,833,865 B1 | 12/2004 | Fuller et al. | |
| 6,847,334 B2 * | 1/2005 | Hayhurst et al. | 345/1.2 |
| 6,877,134 B1 * | 4/2005 | Fuller et al. | 715/202 |
| 7,239,346 B1 * | 7/2007 | Priddy | 348/220.1 |
| 7,403,224 B2 * | 7/2008 | Fuller et al. | 348/231.3 |
| 7,409,144 B2 * | 8/2008 | McGrath et al. | 386/117 |
| 7,532,249 B2 * | 5/2009 | Schultz et al. | 348/375 |
| 2004/0100486 A1 | 5/2004 | Flamini et al. | |
| 2005/0012852 A1 * | 1/2005 | Gann et al. | 348/373 |

(Continued)

FOREIGN PATENT DOCUMENTS

WO 0219702 A1 3/2002

(Continued)

OTHER PUBLICATIONS

Webpage for Object Video, Onboard Providers, 2 pages, http://www.objectivevideo.com/oem/providers/, 2003-2005.

Primary Examiner — Nhan T Tran
Assistant Examiner — Marly Camargo
(74) Attorney, Agent, or Firm — Andrews Kurth LLP (57) ABSTRACT

A system for extracting, processing, and sending metadata associated with audio data and/or video data is described. In one embodiment, a system includes a sensor configured to acquire image data. A first electronic board with a processor is configured to control the sensor. A second electronic board that is configured to enrich the image data is operatively and removably coupled to the first electronic board.

13 Claims, 5 Drawing Sheets

U.S. PATENT DOCUMENTS

| | | |
|---|---|---|
| 2005/0033760 A1 | 2/2005 | Fuller et al. |
| 2005/0038814 A1* | 2/2005 | Iyengar et al. ............. 707/104.1 |
| 2005/0168574 A1 | 8/2005 | Lipton et al. |
| 2005/0169367 A1 | 8/2005 | Venetianer et al. |
| 2005/0285973 A1* | 12/2005 | Singh et al. ................... 348/374 |
| 2005/0289111 A1* | 12/2005 | Tribble et al. ..................... 707/1 |
| 2010/0165188 A1* | 7/2010 | Jannard ........................ 348/375 |

FOREIGN PATENT DOCUMENTS

| | | |
|---|---|---|
| WO | 04042541 A1 | 5/2004 |

* cited by examiner

IMAGE ACQUISITION AND EXPLOITATION CAMERA SYSTEM AND METHODS THEREFORE

RELATED APPLICATIONS

The present application claims priority to the commonly owned U.S. Provisional Patent Application No. 60/669,913, entitled "Image Acquisition and Exploitation Camera System," filed on Apr. 11, 2005, which is incorporated herein by reference in its entirety.

FIELD OF INVENTION

The present invention relates to image and audio processing, and in particular, but not by way of limitation, the present invention relates to a system for extracting, processing and/or sending metadata associated with images and/or sound.

BACKGROUND

Capture devices such as video recorders and still picture cameras can capture, digitize, and store sound and/or images, but are typically limited in their ability to organize, process, and send the information once captured. In applications where, for example, distributed cameras are regularly capturing content, processing and organizing the captured content can be important, particularly if specific portions of the captured content will be subsequently sent and/or retrieved.

Captured content can be organized and processed using post processing techniques that include the extraction and association of metadata. Metadata can be defined based on the captured content, defined using collateral data, and associated with the captured content.

Metadata extraction and association, however, are typically not performed in real-time or substantially real-time. Also, many of the components used to perform the post-capture processing have life cycles that are much shorter than that of a typical capture device. Thus, a need exists for an apparatus with interchangeable components and/or subsystems that can extract, process and send, in real-time or substantially real-time, metadata associated with captured content and/or the captured content.

SUMMARY OF THE INVENTION

In one embodiment, a system includes a sensor configured to acquire image data. A first electronic board with a processor is configured to control the sensor. A second electronic board that is configured to enrich the image data is operatively and removably coupled to the first electronic board.

DETAILED DESCRIPTION

In one embodiment, a camera system, which can also be referred to as an image acquisition and exploitation system, configured to extract, process, and/or send metadata associated with captured sound and/or images (e.g., video) is described. The captured sound and/or images can be referred to as content or captured content. The camera system not only captures the sound and/or images, but also can extract and/or process metadata from the captured content. The camera system can make the captured content and/or associated metadata available to a user for exploitation in substantially real-time. The extracting and/or processing of metadata from associated captured content can be referred to as enriching or indexing. The processing of captured content can be referred to as manipulation.

In another embodiment, a camera system can include multiple distributed capture devices that capture sound and/or images. These captured sound and/or images that can be enriched in distributed subsystems or in a centralized system containing multiple subsystems. The components and/or subsystems included in a camera system can be interchangeable and contained in one or more housings. For example, if applied in, for example, a broadcast facility, content captured on different types of media and transmitted using different methods can be centrally enriched. The centrally enriched content can be sent and/or retrieved with or without associated metadata for immediate use or further processing. Metadata is data about captured content that includes, for example, data, tags, annotations, and/or markings that can be associated with captured content. Metadata can be used to aid a user and/or a computer system to, for example, index/organize/classify, retrieve and/or process captured content.

Figure 1:
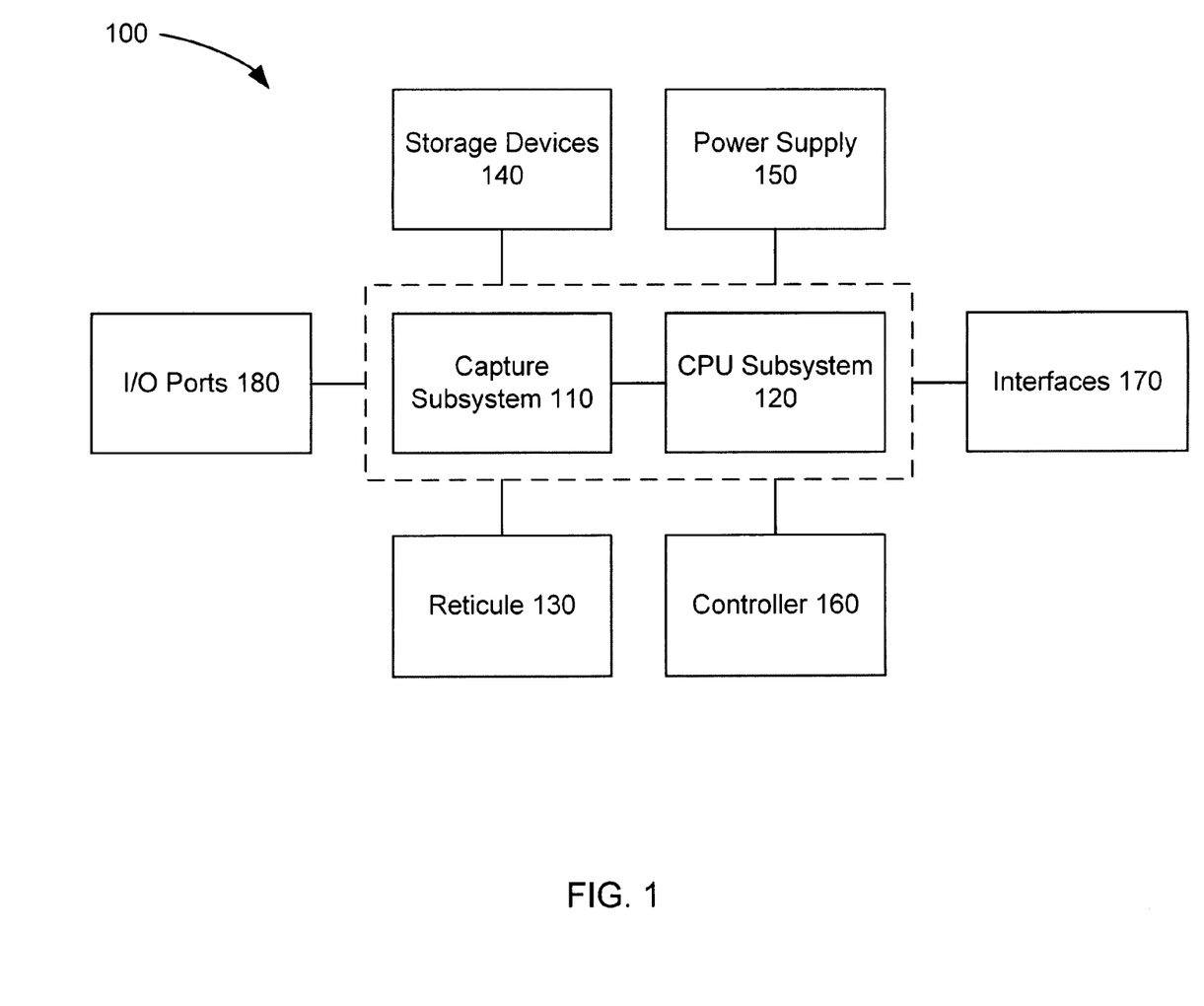
FIG. 1 is a system block diagram of a camera system, according to an embodiment of the invention.

FIG. 1 is a block diagram of a camera system 100, according to an embodiment of the invention. The subsystems (e.g., CPU subsystem 120) and/or components (e.g., reticule 130) can be connected either by wires or coupled wirelessly. The camera system 100 in FIG. 1 includes a capture subsystem 110 that acquires, for example, sound and/or images using, for example, a sensor (not shown). The sensor can be, for example, a still camera or a video camera that can include one or more lenses, charged-coupled device (CCD) chips, microphones, and/or processors. The capture subsystem 110 can also be referred to as a visual and audio capture subsystem. This subsystem 110 captures video and/or audio that can be made available as data for processing (also can be referred to as exploitation) by another subsystem. The capture subsystem 110 can include an ordinary or sophisticated video or still camera with a video and/or audio output.

The camera system 100 in FIG. 1 also includes a central processing unit (CPU) subsystem 120 that can include any combination of processors, memory, video subassemblies and/or audio subassemblies. The CPU subsystem 120 can also include a fixed or removable storage device (not shown) such as a hard disk or flash memory associated with, for example, an application-specific integrated circuit (ASIC) (not shown). Any of the components within the CPU subsystem 120 can be embedded in, for example, an electronic board such as a motherboard. The CPU subsystem 120 can process and be programmed with software applications such as metadata engines that analyze, for example, images in real-time and extract information about content that has been acquired. The CPU subsystem 120 can also include media-asset-management applications and post-production applications for enriching captured content by indexing, manipulating and/or editing the content.

A reticule 130 is included in this camera system 100 for viewing images acquired by the capture subsystem 110. The reticule 130, which can be referred to as a viewfinder, can be any kind of appropriate display. The reticule 130 can also be used to aim, for example, a camera within the capture subsystem 110 to capture video and/or audio. The reticule 130 can also be used to display metadata generated by a metadata generation engine that is executed by, for example, the CPU subsystem 120. The reticule 130 can display images already captured for the purpose of manipulating (e.g., editing) these images.

The camera system 100 also includes a fixed and/or removable storage device 140. The storage device can be, but is not limited to, a tape, DVD, DVC, flash memory, and/or hard disk. The storage device 140, for example, can store applications used to execute metadata extraction engines, editing programs, and can store content that is acquired, generated, or processed by any of the subsystems. The camera system 100 in FIG. 1 also includes a power supply 150 that can be, for example, a rechargeable and/or replaceable power pack or packs that provide power to the associated subsystems.

Camera system 100 includes a controller 160 that allow a user to control subsystems and/or manipulate audio and/or image signals/data. For example, the controller 160 can be used to control components within subsystems such as the zoom on a lens and/or camera system 100 on/off switches. The controller 160 can also be configured to control camera system 100 functions such as marking shots and annotating content. The controller 160 can be directly coupled to and can directly control a particular subsystem within the capture subsystem 110.

Interfaces 170 are also included in this camera system 100 to attach, for example, external monitors, keyboards, mice or other input devices using tactile, audio or optical commands that allow for the content to be identified and/or manipulated. Input and output (I/O) ports 180 can be included as components of the camera system 100. I/O ports 180 can be used to couple to outside systems that, for example, load programs, data, executable commands into the camera system 100 and/or its subsystems. I/O ports 180 can also be used to extract signals, content, and/or metadata from the camera system 100 to outside systems.

The subsystems and/or components of camera system 100 can be modular or interchangeable to allow location in separate device/containers or within the same device/container. Such a device and/or container can also be referred to as a housing. For example, in one embodiment, some of these subsystems and/or components can be located in a housing, while the remaining subsystems can be located near and outside of the housing. Such an embodiment can have, for example, subsystems including the CPU subsystem 120 and its associated applications and software engines (described below) located within a housing while other components such as storage devices 140 can be located with or worn by a user.

The subsystems (e.g., capture subsystem 110) and/or components (e.g., power supply 150) can be included on separate electronic boards that are removably coupled within, for example, a housing of a capture subsystem 110. In some embodiments, the subsystems and/or components can be included on electronic boards in separate housings. Even if in a separate housing the subsystems and/or components can be collectively referred to as a camera system.

Although the components/subsystems can be in separate containers, the components/subsystems are coupled in a mode that prevents degraded quality of the captured content or significant transmission delays that would defeat the advantages of substantially real-time exploitation. In other words, the components/subsystems are coupled so that image and/or sound data can be transmitted between the components with, for example, minimal amounts of buffering or transmission delay. In some embodiments, the components/subsystems, although contained in different containers, can be connected using, for example, category-5 cable within an office complex.

Figure 2:
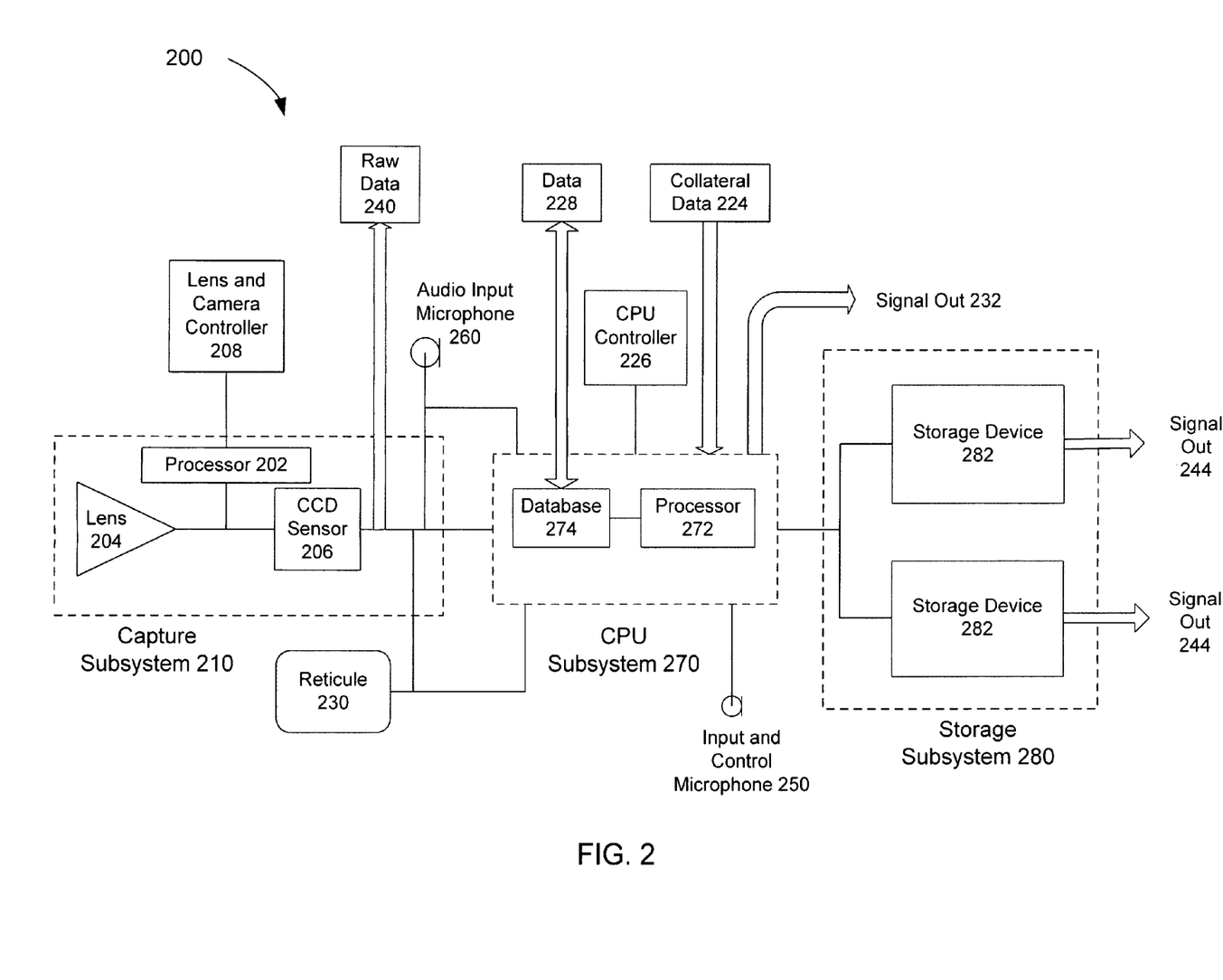
FIG. 2 is system block diagram of a camera system having a capture subsystem, a central processing unit (CPU) subsystem, and a storage subsystem, according to an embodiment of the invention.

FIG. 2 is system block diagram of an example embodiment of a camera system 200 that includes a capture subsystem 210, a CPU subsystem 270, and a storage subsystem 280. The capture subsystem 210 acquires images and/or sounds that are processed by the CPU subsystem 270. After the CPU subsystem 270 processes the information, it is transmitted to the storage subsystem 280. The subsystems within the camera system 200 can be contained in separate housings.

The capture subsystem 210, also referred to as a visual and audio capture subsystem, includes a CCD sensor 206, a set of lenses 204, and a processor 202. The CCD sensor 206 captures, through the lenses 204, visual information (e.g., video) that is converted into a digital data. The digital data is made available to a reticule 230 for viewing as a raw (i.e. unenriched) picture. The capture subsystem 210 also includes a source audio input microphone 260 that digitally captures sound. The captured digital audio and/or video data, which can be collectively referred to as content, are made available to the CPU subsystem 270 for processing. The capture subsystem 210 can be any type of ordinary or sophisticated still camera or video recorder that can include any combination of one or more lenses 204, CCD 206 sensors and/or microphones 260. In some embodiments, the video and/or audio captured by the capture subsystem 210 can be analog signals that are converted into digital signals/data.

The reticule 230 allows for viewing an image that is to be acquired and can be used to aim the CCD sensor 206 and accompanying lens 204 in the capture subsystem 210. The reticule 230 can be used for displaying metadata generated by a metadata generation engine (not shown) within the CPU subsystem 270. The reticule 230 can also be configured to display images so that they can be processed (e.g., edited, annotated) by, for example, a user.

The storage subsystem 280 includes storage devices 282 that can be configured to send captured content (e.g., enriched and/or unenriched) via signals 244 to other systems (not shown) for, for example, further processing and/or distribution. The storage subsystem 280 can store raw content (i.e., unenriched content) or content that has been enriched (e.g., processed and associated with metadata) by the CPU subsystem 270. The storage devices 282 can be any kind of removable storage device. Data can be stored in the storage subsystem 280 in many formats or at multiple data rates. Metadata can be permanently associated with the content (i.e., enriched content) or the content can be separated from the metadata when stored.

The camera system 200 in FIG. 2 also includes a lens and camera controller 208 that is associated with the capture subsystem 210. The lens and camera controller 208, in this embodiment, interfaces with processor 202 to control, for example, the zoom of the lens 204. The lens and camera controller 208 is used to turn the entire camera system 200 on and off. In some embodiments, the lens and camera controller 208 can be configured to turn only a portion of the camera system 200, such as the capture subsystem 210, on and off.

The camera system 200 includes a CPU controller 226 that can be used to control the CPU subsystem 270. For example, the CPU controller 226 can be configured to allow, for example, a user to edit content acquired by the capture subsystem 210. In some embodiments, controls that are associated with other subsystems and/or combinations of subsystems can be used to control any function associated with the camera system 200. For example, a separate control device can be used to mark shots and annotate content.

Figure 4:
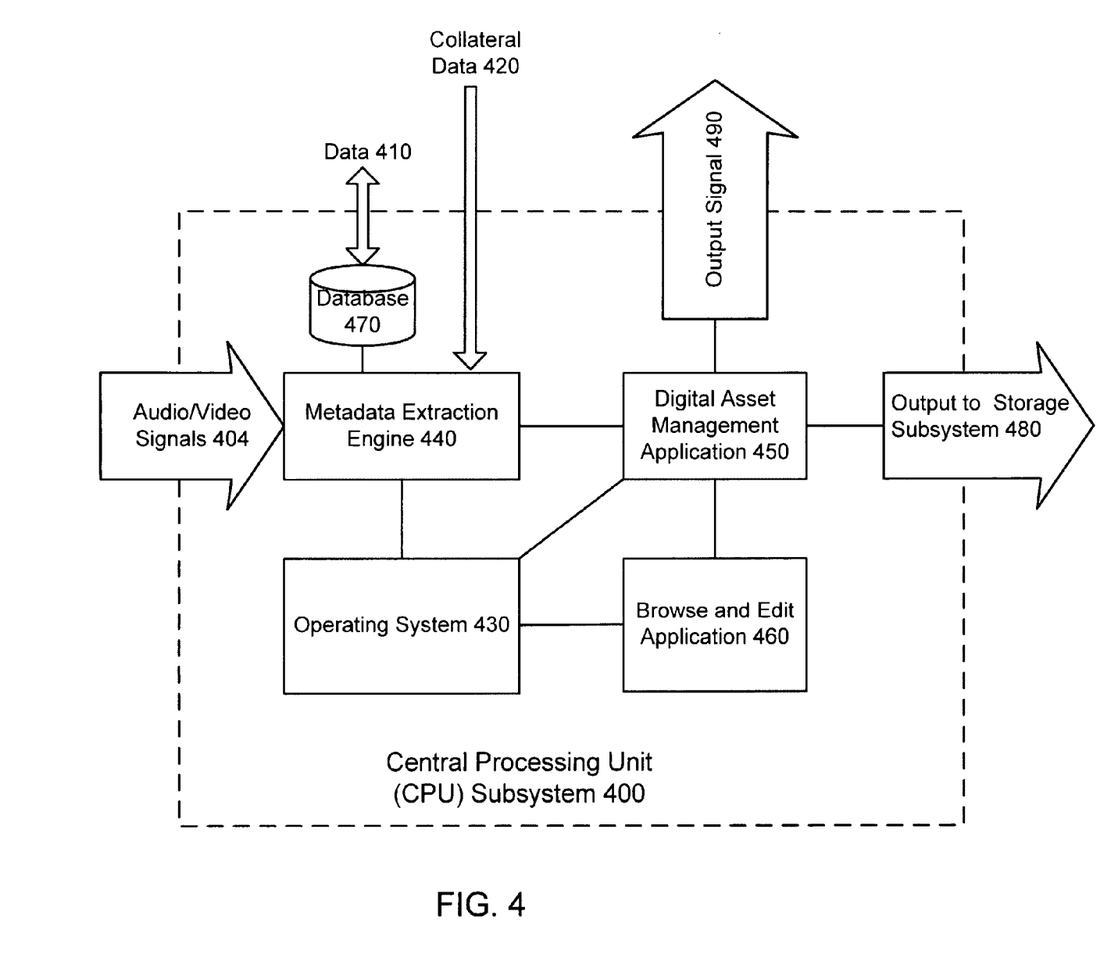
FIG. 4 shows a system block diagram of CPU subsystem, according to an embodiment of the invention.

The CPU subsystem 270 includes a processor 272 and a database 274. The CPU subsystem 270, processes the digital signals produced by the capture subsystem 210 using the processor 272. The processor 272, for example, executes applications for manipulating content captured by the capture subsystem 210. The database 274 can be accessed and used by, for example, applications executed by the processor 272 during the processing of captured content. A more detailed example of a CPU subsystem 270 is shown in FIG. 4.

Referring back to FIG. 2, the capture subsystem 210, the CPU subsystem 270, and the storage subsystem 280 are separate subsystems that can be included as removably coupled subsystems on, for example, separate electronic boards in a single housing or in separate housings. For example, the CPU subsystem 270 and associated components can be included on a motherboard that is in the same housing as a separate motherboard for the capture subsystem 210.

The subsystems of camera system 200, as discussed above, can be located either in separate containers (e.g., device housing) or within the same container. For example, the CPU subsystem 270 can incorporated into an existing capture subsystem 210 housing that includes, for example, an off-the-shelf (OTS) optical camera. The existing capture subsystem 210 can be retrofitted with the CPU subsystem 270. Retrofitting includes re-programming components on, removing components from and/or adding components to the CPU subsystem 270 so that the CPU subsystem 270 is compatible with the existing capture subsystem 210. The CPU subsystem 270 can also include OTS components. Other components such as the storage subsystem 280 can be located nearby or can even be worn by a camera operator. This camera system 200 embodiment can have applications, for example, in the broadcast, military and security industries.

The camera system 200 includes an input and control microphone 250 that can receive commentary from, for example, a camera system operator assisting in the identification of shots and/or describing the content. The input and control microphone 250 can also receive voice commands for the operation of the camera system 200 and/or for the manipulation of the content. Audio input captured by a camera system operator using the input and control microphone 250 can also be analyzed to extract metadata for enriching (e.g. full indexing).

The camera system 200 also includes several inputs and outputs from the subsystems and components. The figure shows that raw data 240 from the CCD sensor 206 can be accessed from the capture subsystem 210, for example, by a system (not shown) that is not part of the camera system 200. The figure also illustrates that collateral data 224 can be input into and an output signal 232 can be extracted from the CPU subsystem 270. Collateral data includes 224, for example, additional marking and/or annotating data that can be used by the CPU subsystem 270 to process image and/or sound data.

The output signal 232 can be a processed signal that contains audio and/or video with associated metadata (i.e., enriched data). The output signal 232 can be transmitted at a single or variable rate. Output signals 244 from the storage devices 282 within the storage subsystem 280 allow the downloading of the stored content and/or associated metadata into asset-management (not shown), archiving (not shown), or library systems (not shown). The data signal 228 is a bidirectional signal that allows for the loading of data into the camera system 200 necessary for metadata extraction and for the population of external databases with data (e.g., audio and/or images) acquired using the camera system 200. In other embodiments, other I/O ports (not shown) can be used to allow programs, data, executable commands to be loaded into the camera system 200 and its subsystems, and to extract a variety of signals, content, and/or metadata out of the camera system 200.

In some embodiments, a rechargeable and or replaceable power pack or packs (not shown) can be used to provide power to any of the subsystems within the camera system 200. In yet other embodiments, interfaces and ports (not shown) for attaching external monitors, keyboards, mice or other input devices using tactile, audio or optical commands can be used to allow for capture content to be identified and/or manipulated.

Figure 3:
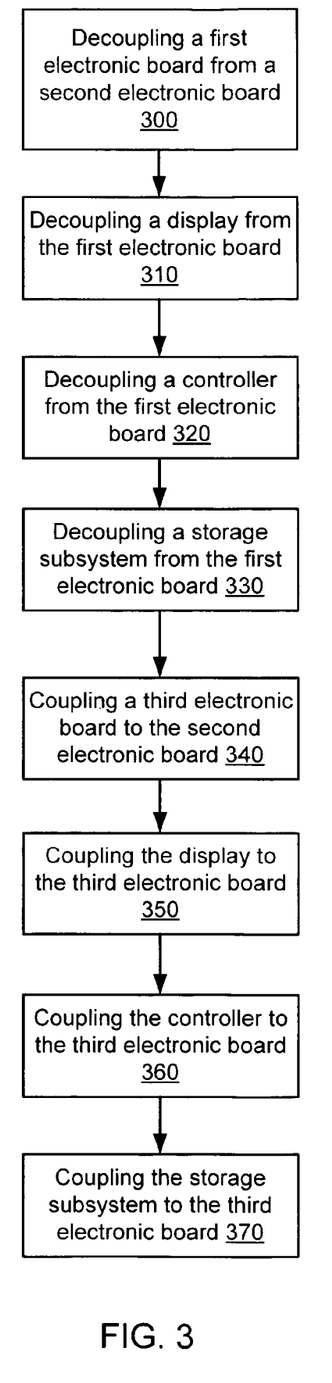
FIG. 3 is a flowchart that illustrates a method for replacing an electronic board within a camera system, according to an embodiment of the invention.

FIG. 3 is a flowchart that illustrates a method for replacing, within a camera system, a first electronic board with a third electronic board (also can be referred to as a replacement board), according to an embodiment of the invention. The first electronic board that is being replaced is coupled to a second electronic board (also can be referred to as a retrofitted electronic board). The first electronic board and the second electronic board are contained in the same housing. The second electronic board can be, for example, a motherboard for a capture subsystem and the first and third electronic boards can be, for example, a CPU subsystem motherboard and a replacement CPU subsystem motherboard, respectively. Alternatively, in some embodiments, the retrofitted electronic board can be contained in a different container/housing as the electronic board that is being replaced.

As shown in FIG. 3, the first electronic board is decoupled from the second electronic board at 300. A display, a controller, and a storage subsystem are all decoupled from the first electronic board at 310, 320, and 330, respectively. The third electronic board is then coupled to the second electronic board at 340. The display, controller, and storage subsystem are all coupled to the third electronic board at 350, 360, and 370, respectively. When the first electronic board is replaced by the third electronic board, the second electronic board, display, controller, and storage subsystem, etc. are retrofitted with the third electronic board. Retrofitting can include, for example, one or more of programming components on, removing components from and/or adding components to the third electronic board so that the third electronic board is compatible with each of the components/subsystems to which the third electronic board is coupled.

Although FIG. 3 shows that the first electronic board is decoupled first, the display is decoupled second, the controller is decoupled third, etc., the subsystems/components can be decoupled and coupled in any order in other embodiments. For example, in some embodiments, the display can be decoupled from the first electronic board and coupled to the third electronic board before the first electronic board is decoupled from the second electronic board. Also, in some embodiments, other components and/or subsystems, such as a power supply, can be retrofitted with a replacement electronic board.

FIG. 4 is an example of a CPU subsystem 400 that executes various software applications including an operating system 430 and applications. Such applications can be, for example, third-party applications (i.e., off-the-shelf applications). The applications can include, for example, metadata extraction engines 440 (e.g., Virage's Videologger and/or Audiologger), digital-asset-management 450 (e.g., Artesia Technologies' Digital Asset Management (DAM)) and browsing and editing programs 460 (e.g., Apple's Final Cut Pro). The CPU subsystem 400 can be configured to use many types of off-the-shelf (OTS) software, for example, security software that includes moving object, gate, and/or object analysis (e.g., Cemium Perceptrak). These programs can be used to manipulate captured content on-demand using input devices such as, but not limited to, a keyboard (not shown), a mouse (not shown), or by using voice or optical commands (not shown). The manipulated and/or raw content can be displayed through a reticule (not shown) or through an outside device such as a monitor (not shown). The applications can be executed on one or more processors (not shown) within the CPU subsystem 400. Processors within the CPU subsystem 400 can be specialized modules (e.g., ASICS or digital signal processors) dedicated to performing specific functions such as metadata extraction.

Collateral data 420, which can also be referred to as customizable data, such as date, time, camera properties, GPS etc. can also be received by the CPU subsystem 400. Other collateral data 420 such as clip marking generated by applications and/or hardware from manufacturers (e.g., Sony) can also be entered into the CPU subsystem 400.

Signals received by the CPU subsystem 400 such as audio and/or video signals 404 are received and processed using the applications described above. The audio and/or video signals 404 can be received from, for example, a capture subsystem (not shown). The processing of the audio and/or video signals 404 within the CPU subsystem 400 is managed by a digital-asset-management application 450. The digital-asset-management application 450 can send and/or receive raw and/or enriched content from the metadata extraction engine 440 and/or the browse and edit application 460. The digital-asset-management application 450 can also send raw and/or enriched content as an output signal 490 and/or as an output to a storage subsystem 480.

The metadata extraction engine 440 provides analysis of the audio/video signal 404 by extracting information about the content such as faces, words, keyframe information through speech to text conversion, speaker identification, visual properties face recognition, voice recognition, optical character recognition (OCR), and other characteristics and attributes. The method of extraction, amount of information and reliability of the extracted data depends on the particular metadata extraction engine 440. The metadata extraction engine 440 produces a high-resolution indexed data stream and a low-resolution proxy data stream. These streams can be provided to the storage subsystem 480, can be output as a signal 490, and/or can be output to the browse-and-edit application 460. The metadata extraction engine 440 can also generate content at multiple data rates and multiple resolutions. Lower rates can be used for searching and browsing. A lower rate system output reduces the required average bandwidth for transmitting the content, raw or indexed.

The browse-and-edit application 460 can be manipulated by, for example, an operator using a control console (not shown). Content that is edited by the browse-and-edit application 460 can be transmitted with or without associated metadata as an output signal 490 and/or to the storage subsystem 480 via the digital-asset-management application 450. The content-based metadata or any other data stream can also be displayed on a reticule (not shown). The reticule can also be used to monitor the manipulation of data when editing.

Metadata extracted from captured content and/or raw (i.e., original) content can be stored in, for example, a storage subsystem (not shown) or in database 470. The data can be stored in one or more formats. In some embodiments, the metadata can be permanently associated with the captured content. The captured content and/or metadata can be stored at multiple data rates. The captured content can be separated from the metadata and stored as raw (i.e., original) content.

Figure 5:
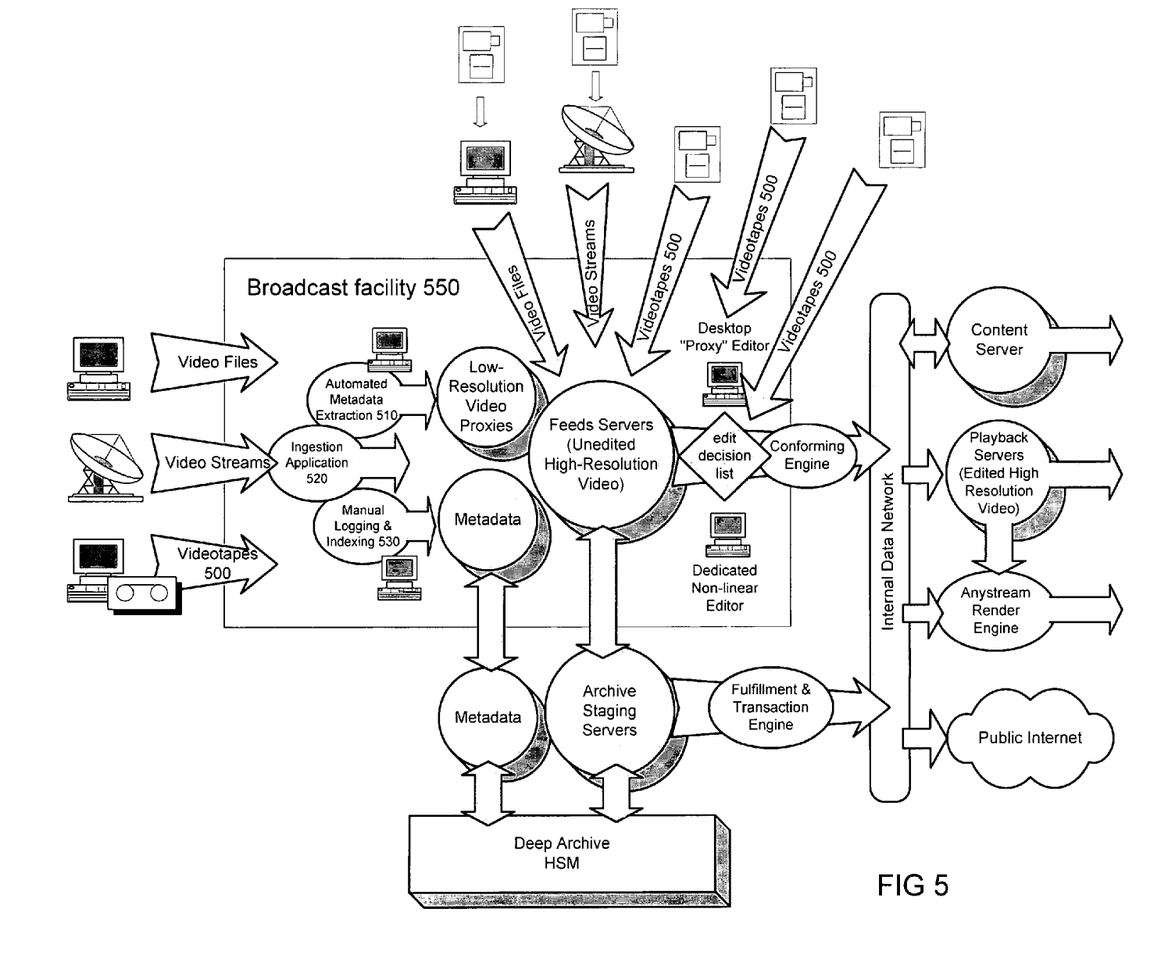
FIG. 5 shows a camera system integrated into a broadcast facility, according to an embodiment of the invention.

FIG. 5 shows a camera system used in conjunction with a typical broadcast facility 550. The figure shows examples of the signals that flow within the typical broadcast facility. The system block unit identified as videotapes 500 can include for example, but is not limited to, a digital video disc (DVD), a digital video cassette (DVC), flash memory and/or a hard disk. The videotapes 500 can be transmitted via a wireless connection, a universal serial bus (USB) connection, and/or a firewire connection.

FIG. 5 shows the system block units automated metadata extraction 510, ingestion application 520 and manual logging & indexing 530. Each of these system block units represent one or more applications that can be executed within, for example, a CPU subsystem within a camera system as described above in reference to FIGS. 1-4. In this embodiment shown in FIG. 5, the system block units can be internal to the broadcast facility 500 and process image and/or sound data to produce any combination of raw or enriched content. In other embodiments, the system block units can be located internal to or co-located with the camera system in addition to being located at the broadcasting facility. Thus, the camera system discussed above in reference to FIGS. 1-4 can be used with existing broadcast facilities and can provide some of the broadcast functionality at the camera system.

In conclusion, among other things, a system for extracting, processing, and sending metadata associated with audio data and/or video data is described. While various embodiments of the invention have been described above, it should be understood that they have been presented by way of example only, and various changes in form and details may be made. For example, the camera system can be used in many applications such as, for example, security and military applications.

What is claimed is:

1. A portable modular system for facial recognition, comprising:
    a portable sensor container comprising:
    a visual sensor configured to acquire image data including a face; and
    a first electronic board including a first processor to control the sensor;
    a portable storage housing, operatively and removably connected to the portable sensor container by a cable or wirelessly, comprising a storage subsystem including a database of metadata relating to faces;
    a face recognition electronic board including a second processor used to extract and associate metadata in substantially real-time, wherein information about faces is extracted from the acquired image data and associated with the acquired image data as metadata about faces, the face recognition electronic board is in communication with the first electronic board and the storage subsystem;
    a portable display device directly connected to at least one of the portable sensor container and the portable storage housing, the portable display device receiving data and displaying data in substantially real-time from at least one of the first electronic board and the face recognition electronic board, wherein the acquired image and results of the metadata extraction and association including face recognition are simultaneously shown in substantially real-time on the portable display device; and an audio sensor to acquire audio data, wherein the first processor receives the audio data from the audio sensor, the second processor enriches the audio data in substantially real-time, wherein the portable sensor container, the portable storage housing and the portable display device are modular components with connectors and may be disconnected by a user without tools for flexible arrangement and use by a user including flexibility in the location of the modular components.

2. The system of claim 1, further comprising:
a controller coupled to the face recognition electronic board, the controller receives an input, the controller controls the enriching of the image data by the second processor based on the input.

3. The system of claim 1, wherein the face recognition electronic board receives at least one of a collateral data or an audio signal from a microphone.

4. The system of claim 1, wherein said second processor performs in substantially real-time face recognition.

5. The system of claim 1, wherein said second processor produces a high-resolution indexed data stream and a low-resolution proxy data stream.

6. The system of claim 1, wherein said second processor generates content at multiple data rates and multiple resolutions.

7. The system of claim 1 wherein said second processor performs in substantially real-time visual properties recognition.

8. The system of claim 1 wherein said second processor performs in substantially real-time voice recognition and speaker identification.

9. The system of claim 1 wherein said second processor performs in substantially real-time words and optical character recognition.

10. The system of claim 1 wherein said second processor performs in substantially real-time speech to text conversion.

11. A portable modular system for facial recognition, comprising:

a capture subsystem, housed in a portable container, having a sensor configured to capture visual content, the captured visual content including a face;

a portable housing, operatively and removably connected to the container by a cable or wirelessly, including a storage device wherein a database of metadata relating to face recognition is stored, wherein the housing is portable;

a central processing unit (CPU) subsystem wherein metadata is both extracted from the captured visual content and associated with the captured visual content in substantially real-time, the CPU subsystem communicating with the housing, and the CPU subsystem processing the associated metadata relating to face recognition and visual content using a digital asset management application;

a portable display device, connected to the housing, the display device receiving and displaying metadata in substantially real-time, wherein the results of the metadata extraction and association include face recognition and are displayed in substantially real-time; and an audio sensor to acquire audio data, wherein the CPU subsystem receives the audio data from the audio sensor and enriches the audio data in substantially real-time, wherein the portable container, the portable housing and the portable display device are modular components with connectors and may be disconnected by a user without tools for flexible arrangement and use by a user including flexibility in the location of the modular components.

12. The system of claim 11, further comprising:
a CPU controller which receives an input, the CPU controller controls a function associated with the CPU subsystem based on the input.

13. The system of claim 11, further comprising:
a controller which receives an input, the controller controls a function associated with the capture subsystem based on the input.

* * * * *